US006609283B1

(12) United States Patent
Somerville

(10) Patent No.: US 6,609,283 B1
(45) Date of Patent: Aug. 26, 2003

(54) CONVERTIBLE EXTERNAL/INTERNAL PULLER DEVICE

(76) Inventor: Dean S. Somerville, 805 Sunflower Ave. P.O. Box 246, Cooperstown, ND (US) 58425

( * ) Notice: Subject to any disclaimer, the term of this patent is extended or adjusted under 35 U.S.C. 154(b) by 0 days.

(21) Appl. No.: 10/115,368

(22) Filed: Apr. 4, 2002

(51) Int. Cl.[7] .................................................. B23P 19/04

(52) U.S. Cl. ............................. 29/262; 29/255; 29/264; 29/261

(58) Field of Search .......................... 29/262, 261, 264, 29/267, 255, 259

(56) References Cited

U.S. PATENT DOCUMENTS 1,164,704 A * 12/1915 Courembis .................... 29/262
1,361,316 A * 12/1920 Dotzer et al. ................. 29/261
2,303,560 A * 12/1942 Knight ......................... 29/262
3,103,740 A * 9/1963 Crenshaw .................... 29/262
4,007,535 A * 2/1977 Brandt et al. ................. 29/261
5,159,743 A * 11/1992 Somerville ................... 29/261

* cited by examiner

*Primary Examiner*—Lee D. Wilson

(57) ABSTRACT

A convertible external/internal puller device for pulling bearings and races from within and about objects such as shafts and axles and other machine parts. The convertible external/internal puller device includes a support frame; and also includes an elongate tubular support member being disposed within the support frame and having a threaded bore extending therethrough and also being externally threaded; and further includes a jaw support member being adjustably threaded upon the elongate tubular support member; and also includes a plurality of interchangeable jaw members being pivotally attached with fasteners to the jaw support member and being guided by the support frame; and also includes an elongate press member being threaded through the elongate tubular support member and having a first end and a second end which is adapted to engage an object; and further includes a handle member being mounted to the elongate tubular support member for rotating the elongate tubular support member.

8 Claims, 4 Drawing Sheets

CONVERTIBLE EXTERNAL/INTERNAL PULLER DEVICE

BACKGROUND OF THE INVENTION

1. Field of the Invention

The present invention relates to convertible pulling tools and more particularly pertains to a new convertible external/internal puller device for pulling bearings and races from within and about objects such as shafts and axles and other machine parts.

2. Description of the Prior Art

The use of convertible pulling tools is known in the prior art. More specifically, convertible pulling tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,380,068; U.S. Pat. No. 4,007,535; U.S. Pat. No. 4,068,365; U.S. Pat. No. 4,649,615; U.S. Pat. No. 5,174,005; and U.S. Pat. No. 5,251,368.

While these devices fulfill their respective, particular objectives and requirements, the aforementioned patents do not disclose a new convertible external/internal puller device. The prior art describes inventions having a support frame made specifically and only for external-pulling jaw members and also having a support frame made specifically and only for internal-pulling jaw members.

SUMMARY OF THE INVENTION

The general purpose of the present invention, which will be described subsequently in greater detail, is to provide a new convertible external/internal puller device which has many of the advantages of the convertible pulling tools mentioned heretofore and many novel features that result in a new convertible external/internal puller device which is not anticipated, rendered obvious, suggested, or even implied by any of the prior art convertible pulling tools, either alone or in any combination thereof. The present invention includes a support frame; and also includes an elongate tubular support member being disposed within the support frame and having a threaded bore extending therethrough and also being externally threaded; and further includes a jaw support member being adjustably threaded upon the elongate tubular support member; and also includes a plurality of interchangeable jaw members being pivotally attached with fasteners to the jaw support member and being guided by the support frame; and also includes an elongate press member being threaded through the elongate tubular support member and having a first end and a second end which is adapted to engage an object; and further includes a handle member being mounted to the elongate tubular support member for rotating the elongate tubular support member. None of the prior art allows for interchangeable jaw members with just one support frame.

There has thus been outlined, rather broadly, the more important features of the convertible external/internal puller device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new convertible external/internal puller device which has many of the advantages of the convertible pulling tools mentioned heretofore and many novel features that result in a new convertible external/internal puller device which is not anticipated, rendered obvious, suggested, or even implied by any of the prior art convertible pulling tools, either alone or in any combination thereof.

Still another object of the present invention is to provide a new convertible external/internal puller device for pulling bearings and races from within and about objects such as shafts and axles and other machine parts.

Still yet another object of the present invention is to provide a new convertible external/internal puller device that is easy and convenient to interchange the external-pulling jaw members with the internal-pulling jaw members and vice versa.

Even still another object of the present invention is to provide a new convertible external/internal puller device that eliminates the user from having to purchase two separate locking puller devices.

These together with, other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
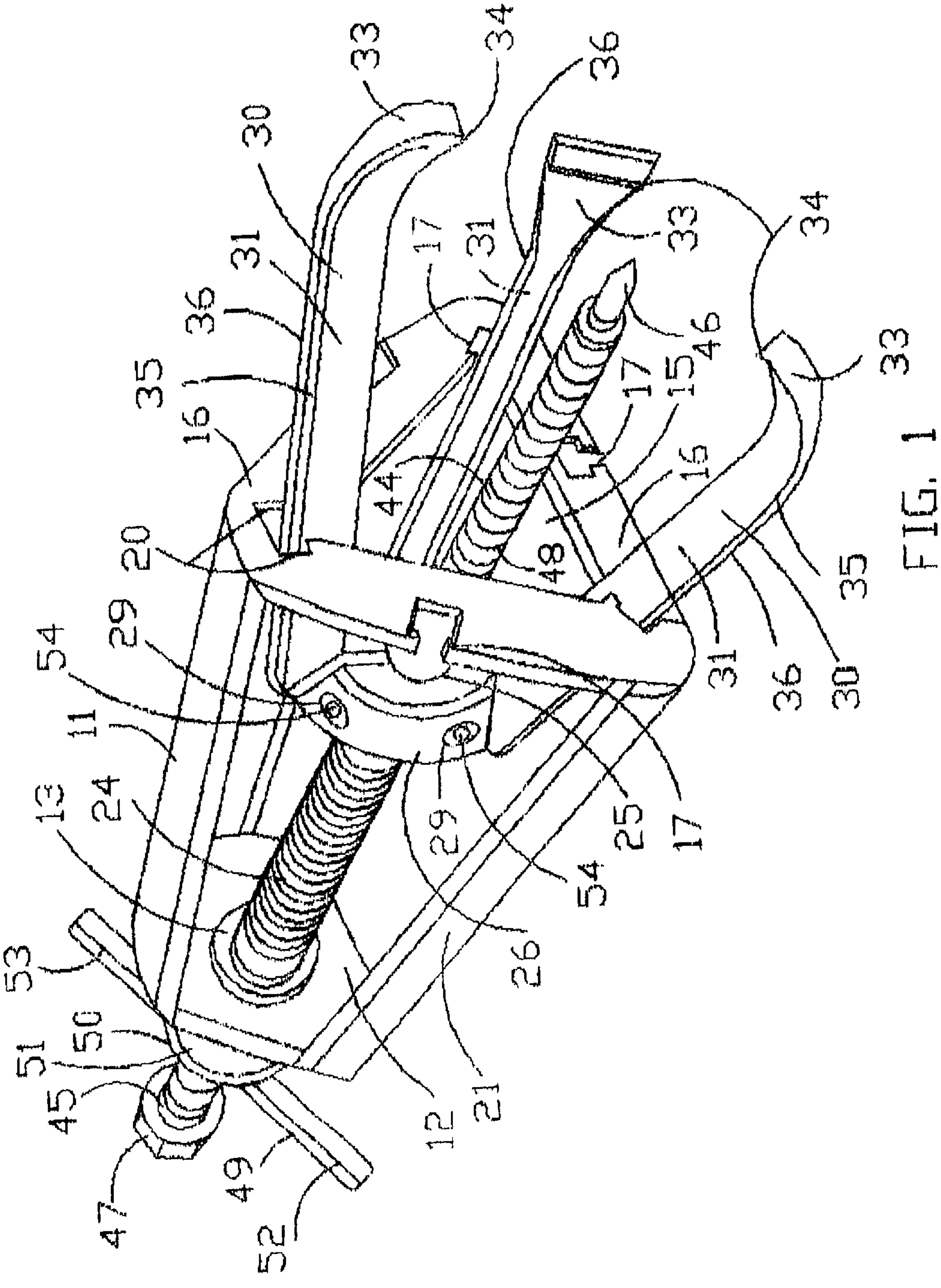
FIG. 1 is a perspective view of a new convertible external/internal locking puller device according to the present invention and being converted to the external version.
Figure 2:
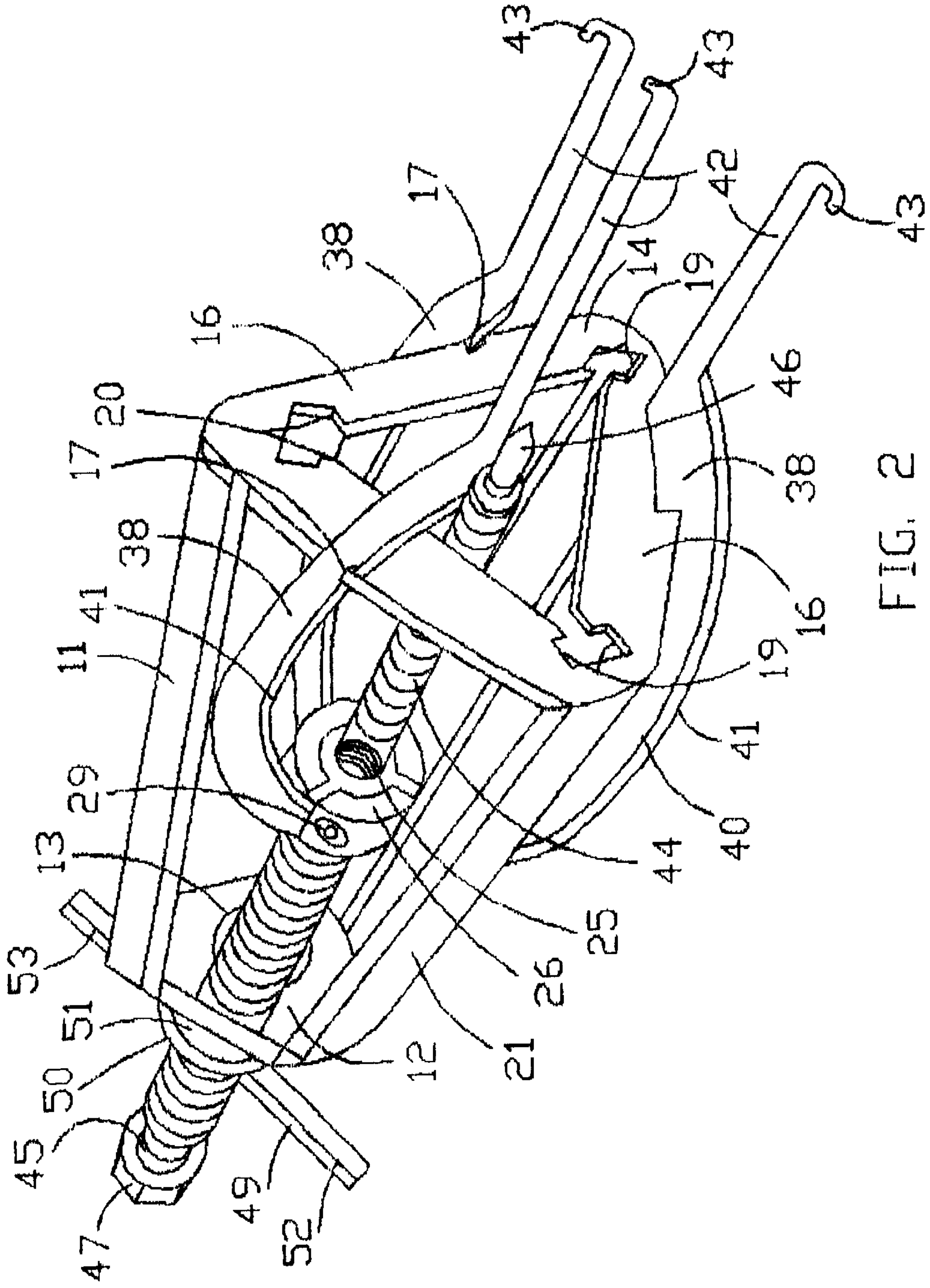
FIG. 2 is a perspective view of internal version of the present invention.
Figure 3:
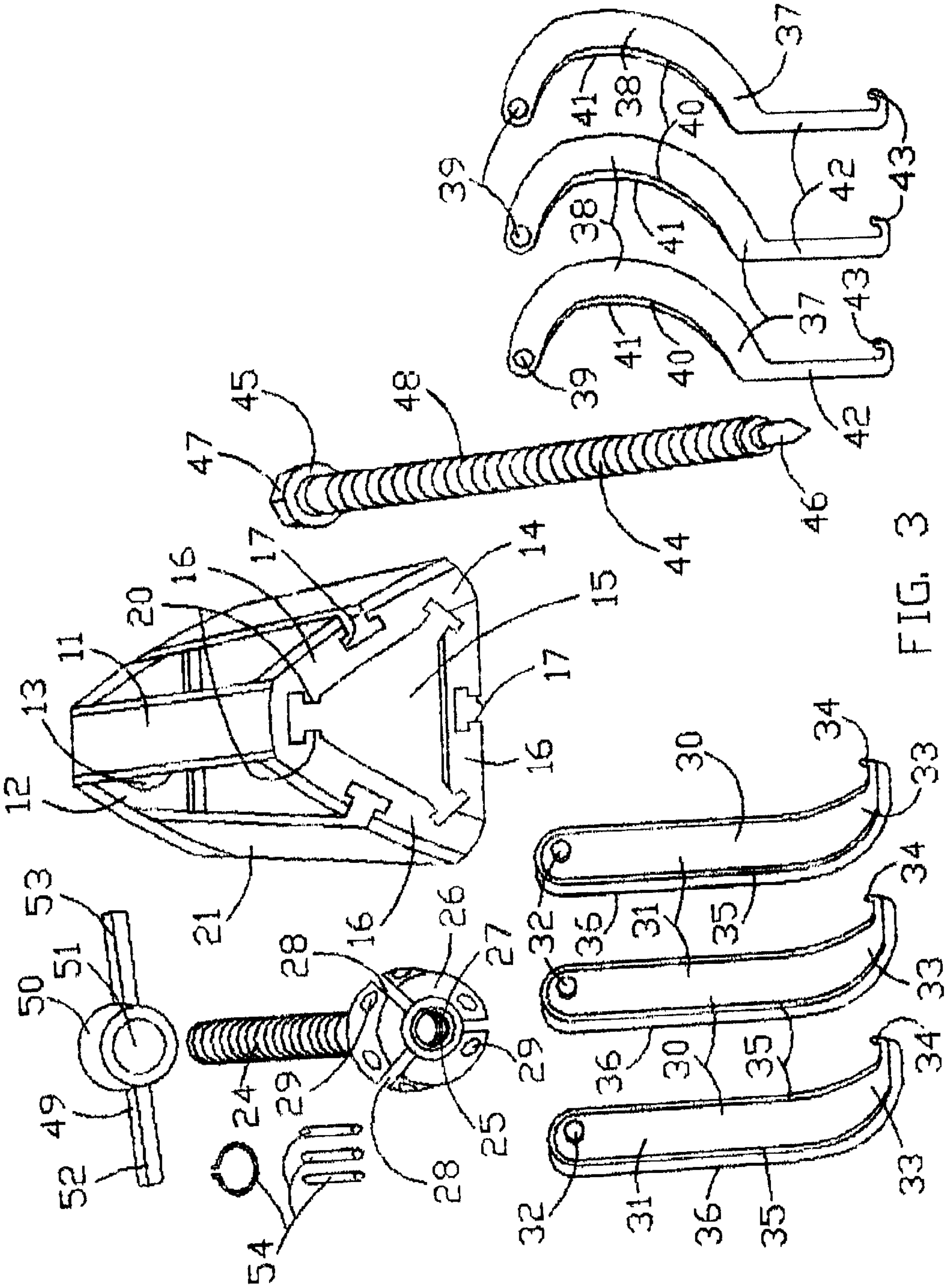
FIG. 3 is an exploded side elevational view of the present invention.
Figure 4:
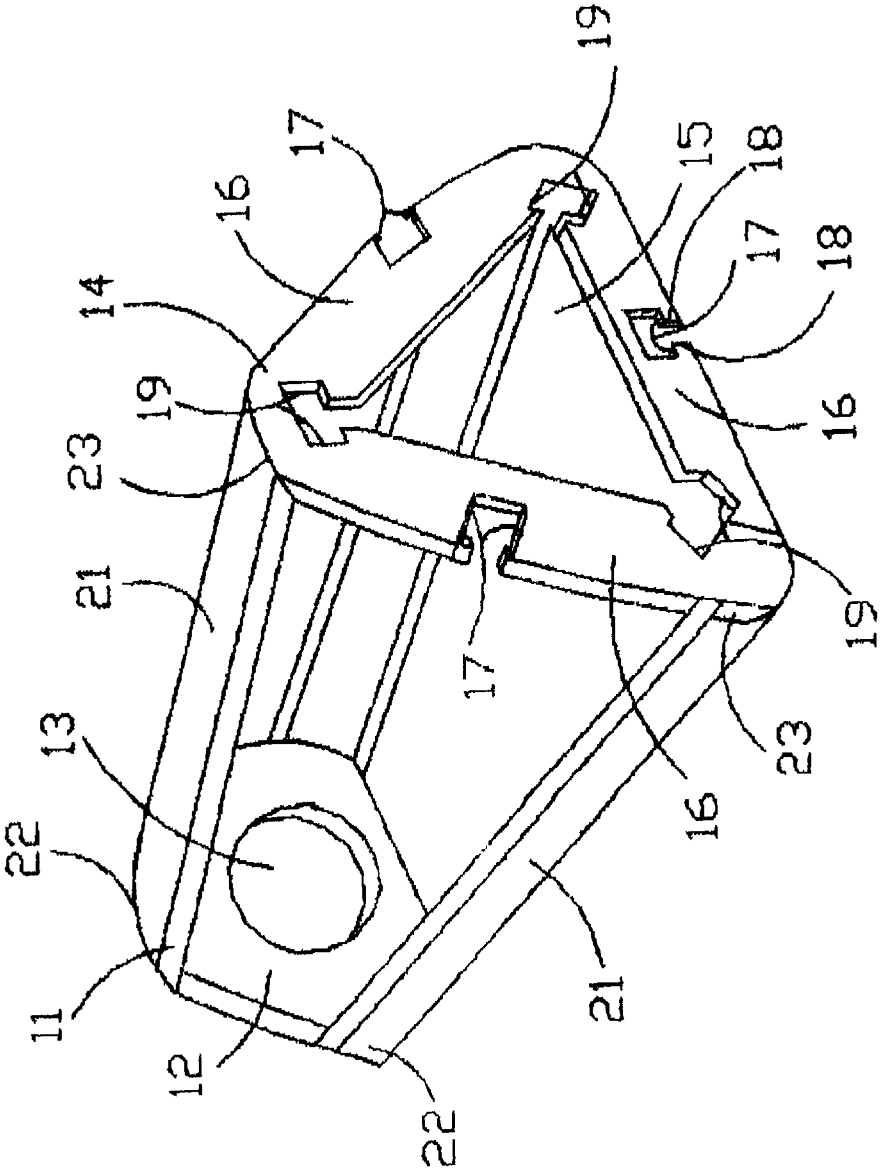
FIG. 4 is a perspective view of the support frame of the present invention.

With reference now to the drawings, and in particular to FIGS. 1 through 4 thereof, a new convertible external/internal puller device embodying the principles and concepts of the present invention and generally designated by the reference numeral 10 will be described.

As best illustrated in FIGS. 1 through 4, the convertible external/internal puller device 10 generally comprises a support frame 11. The support frame includes a first end piece member 12 having a hole centrally 13 disposed therethrough, and also includes a plurality of elongate brace members 21 being spaced apart and having first ends 22 being securely and conventionally attached and welded to the first end piece member 12, and further includes a second end piece member 14 being securely and conventionally attached and welded to second ends 23 of the plurality of elongate brace members 21 and having a triangular-shaped opening 15 being disposed therethrough and forming elongate side members 16. The elongate side members 16 are arranged to form a triangular-shaped structure with each of the elongate side members 16 having a outer longitudinal edge and also having a first slot 17 being centrally disposed in the outer longitudinal edge. Each of the elongate side members 16 further has pairs of lug members 18 being opposedly and integrally attached to sides of the first slot 17 and being extended towards one another in the first slot 17. The second end piece member 14 further includes a plurality of second slots 19 being disposed in an edge forming the triangular-shaped opening 15 and being disposed at vertexes of the triangular-shaped structure, and also includes pairs of lug members 20 being opposedly and integrally attached to sides of the second slots 19 and being extended toward one another in the second slots 19. The first and second slots 17,19 are generally T-shaped. The elongate brace members 21 slant outwardly away from one another from the first ends 22 to the second ends 23 thereof. An elongate tubular support member 24 is disposed within the support frame 11 and has a threaded bore 25 extending therethrough and also is externally threaded.

A jaw support member 26 is adjustably threaded upon the elongate tubular support member 24. The jaw support member 26 is generally a disc-shaped member having a threaded bore 27 extending therethrough and along a longitudinal axis thereof, and also has a plurality of radially-extending slots 28 being circumferentially spaced and extending through a circumference thereof, and further has a plurality of fastener-receiving bores 29 extending through the circumference of the disc-shaped member and extending laterally through the radially-extending siots 28.

A plurality of interchangeable jaw members 30,37 are pivotally attached with fasteners 54 to the jaw support member 26 and are guided by the support frame 11. The interchangeable jaw members 30,37 include a plurality of external-pulling jaw members 30 and a plurality of internal-pulling jaw members 37. Each of the external-pulling jaw members 30 includes a flared shaft portion 31 as viewed from a side thereof with the flared shaft portion 31 having a hole 32 being disposed therethrough at an end thereof and removably receiving a respective one of the fasteners 54 and being pivotally received in a respective one of the radially-extending slots 28. Each the external-pulling jaw member 30 also includes an arcuate jaw portion 33 having a hook-shaped end 34 for engaging an object to be pulled and further including longitudinal flanges 35 integrally extending along outer edges 36 on opposite sides of the external-pulling jaw member 30 and being received and retained by the lug members 20 in the second slots 19. The outer edges 36 are distally-disposed relative to the hook-shaped end 34. Each of the internal-pulling jaw members 37 includes an arcuate shaft portion 38 having a hole 39 being disposed therethrough at an end thereof and removably receiving a respective one of the fasteners 54 and being pivotally disposed in a respective one of the radially-extending slots 28, and also includes a generally straight jaw portion 42 having a hook-shaped end 43 for engaging an object to be pulled, and further includes longitudinal flanges 40 extending along outer edges 41 of opposite sides of the internal-pulling jaw member 37 with the outer edges 41 being proximately-disposed relative to the hook-shaped end 43.

An elongate press member 44 is threaded through the elongate tubular support member 24, and has a first end 45 and a second end 46 which is adapted to engage an object. The elongate press member 44 is a rod having a main portion 48 and also having a tool-grasping multi-sided enlarged portion 47 being conventionally disposed near the first end 45 thereof with the second end 46 being pointed. The elongate press member 44 further has an annular recessed portion extending from the second end 46 thereof. The main portion 48 is threaded along a portion of a length thereof beginning from the annular recessed portion.

A handle member 49 is conventionally mounted to the elongate tubular support member 24 for rotating the elongate tubular support member 24. The handle member 49 includes a disc-shaped main portion 50 having a bore 51 extending therethrough along a longitudinal axis thereof, and also includes wing portions 52,53 being diametrically-opposed to one another and extending outwardly from the disc-shaped main portion 50. The elongate press member 44 is extended through the bore 51 of the handle member 49 with the bore 51 of the handle member 49 receiving an end portion of the elongate tubular support member 24.

In use, the user pivotally attaches the external-pulling jaw members 30 to the jaw support member 26 and places the hook-shaped ends about the outside of the object such as a wheel and a bearing to be pulled, and the user places the elongate press member 44 against the support structure from which the object is to be removed, and then turns the handle member 49 to draw the jaw support member 26 and the external-pulling jaw members 30 away from the support structure thus pulling and removing the object from the support structure. To pull an object such as a race placed inside a support structure, the user simply removes the external-pulling jaw members 30 and pivotally attaches the internal-pulling jaw members 37 and places the hook-shaped ends 43 within the object and turns the handle member 49 to draw the jaw support member 26 and the internal-pulling jaw members 37 away from the support structure thus pulling and removing the object from within the support structure.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the convertible external/internal puller device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A convertible external/internal locking puller device comprising:

a support frame including a first end piece member having a hole centrally disposed therethrough, and also including a plurality of elongate brace members being spaced apart and having first ends being securely attached to said first end piece member, and further including a second end piece member being securely attached to second ends of said plurality of elongate brace members and having a triangular-shaped opening being disposed therethrough and forming elongate side members, said elongate side members being arranged to form a triangular-shaped structure, each of said elongate side members having an outer longitudinal edge and also having a first slot being centrally disposed in said outer longitudinal edge, each of said elongate side members further having pairs of lug members being opposedly attached to sides of said first slot and being extended towards one another in said first slot an elongate tubular support member being disposed within said support frame and having a threaded bore extending therethrough and also being externally threaded;

a jaw support member being adjustably threaded upon said elongate tubular support member;

a plurality of interchangeable jaw members being pivotally attached with fasteners to said jaw support member and being guided by said support frame;

an elongate press member being threaded through said elongate tubular support member and having a first end and a second end which is adapted to engage an object; and a handle member being mounted to said elongate tubular support member for rotating said elongate tubular support member.

2. A convertible external/internal locking puller device as described in claim 1, wherein said second end piece member further includes a plurality of second slots being disposed at vertexes of said triangular-shaped structure, and also includes pairs of lug members being opposedly attached to sides of said second slots and being extended toward one another in said second slots.

3. A convertible external/internal locking puller device as described in claim 2, wherein said first and second slots are generally T-shaped.

4. A convertible external/internal locking puller device as described in claim 2, wherein said elongate brace members slant outwardly away from one another from said first ends to said second ends thereof.

5. A convertible external/internal locking puller device as described in claim 2, wherein said jaw support member is generally a disc-shaped member having a threaded bore extending therethrough and through a longitudinal axis thereof, and also has a plurality of radially-extending slots being circumferentially spaced and extending through a circumference thereof, and further has a plurality of fastener-receiving bores extending through the circumference of said disc-shaped member and extending laterally through said radially-extending slots.

6. A convertible external/internal locking puller device as described in claim 2, wherein said interchangeable jaw members includes a plurality of external-pulling jaw members and a plurality of internal-pulling jaw members.

7. A convertible external/internal locking puller device as described in claim 6, wherein each of said external-pulling jaw members includes a flared shaft portion as viewed from a side thereof, said flared shaft portion having a hole being disposed therethrough at an end thereof and removably receiving a respective one of said fasteners and being pivotally received in a respective one of said radially-extending slots, each said external-pulling jaw member also including an arcuate jaw portion having a hook-shaped end for engaging an object to be pulled and further including longitudinal flanges extending along outer edges on opposite sides of said external-pulling jaw member and being received and retained by said lug members in said second slots, said outer edges being distally-disposed relative to said hook-shaped end.

8. A convertible external/internal locking puller device as described in claim 7, wherein each of said internal-pulling jaw members includes an arcuate shaft portion having a hole being disposed therethrough at an end thereof and removably receiving a respective one of said fasteners and being pivotally disposed in a respective one of said radially-extending slots, and also includes a generally straight jaw portion having a hook-shaped end for engaging an object to be pulled, and further includes longitudinal flanges extending along outer edges of opposite sides of said internal-pulling jaw member, said outer edges being proximately-disposed relative to said hook-shaped end.

* * * * *